March 18, 1924. 1,487,639
W. Z. WILLIS
WAGON BRAKE
Filed Dec. 11, 1922 2 Sheets-Sheet 1
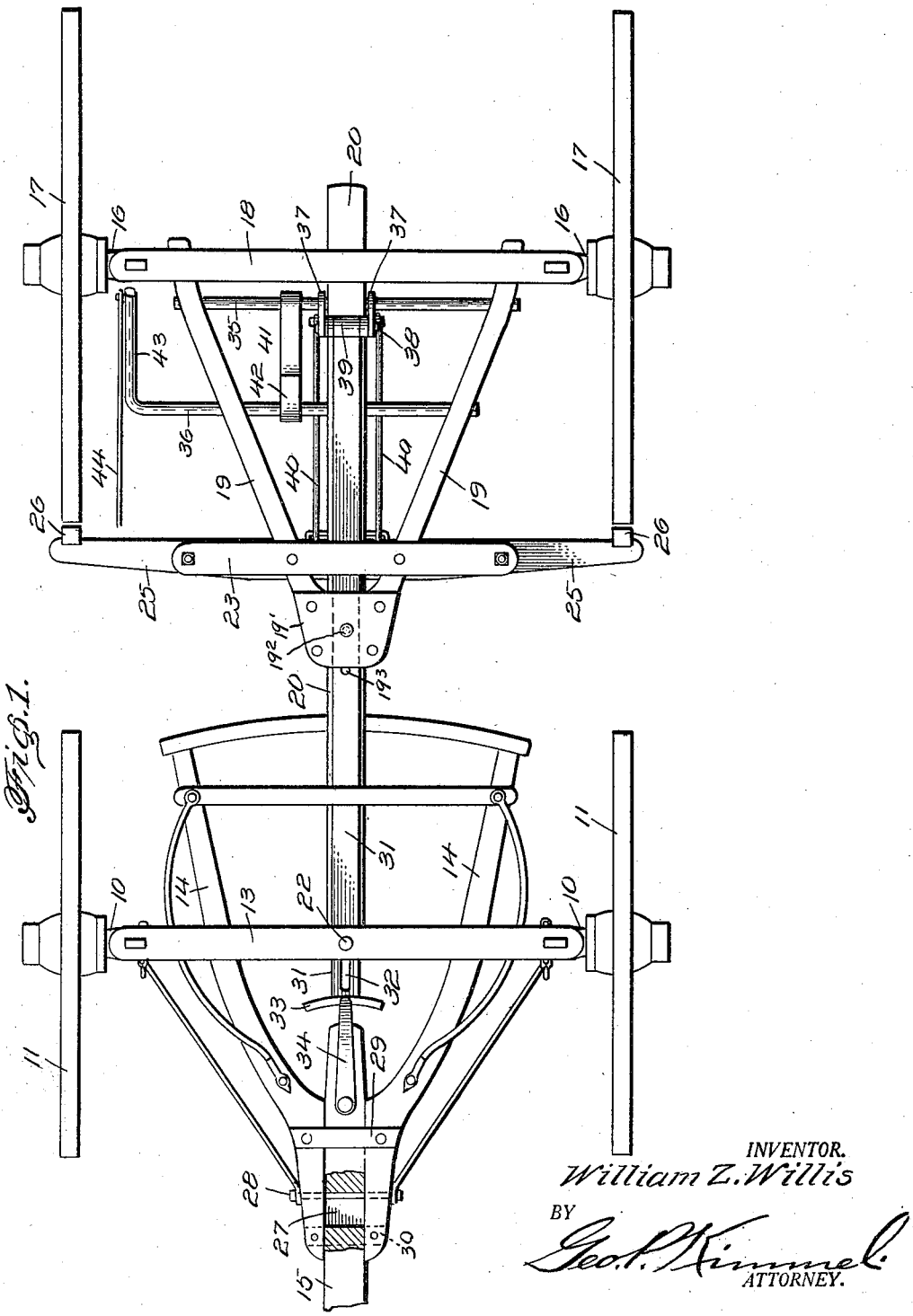

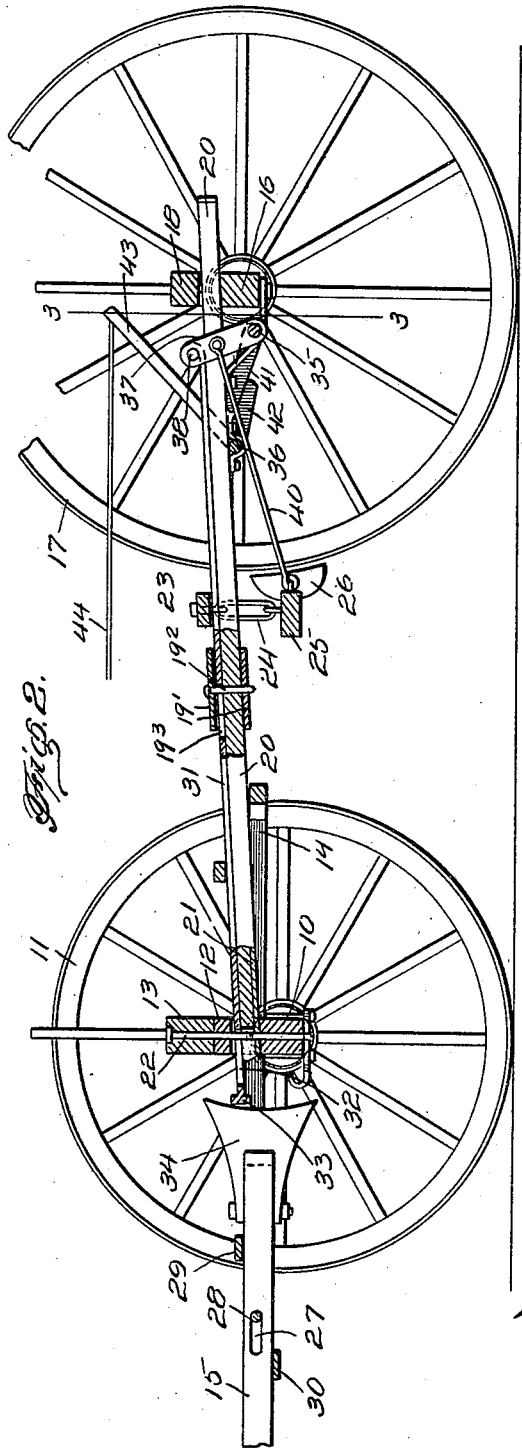

Patented Mar. 18, 1924.

1,487,639

UNITED STATES PATENT OFFICE.

WILLIAM Z. WILLIS, OF OAKMAN, ALABAMA, ASSIGNOR OF FORTY-NINE ONE-HUN-DREDTHS TO CLAUDE D. ROBERTS, OF OAKMAN, ALABAMA.

WAGON BRAKE.

Application filed December 11, 1922. Serial No. 606,153.

*To all whom it may concern:*

Be it known that I, WILLIAM Z. WILLIS, a citizen of the United States, residing at Oakman, in the county of Walker and State of Alabama, have invented certain new and useful Improvements in Wagon Brakes, of which the following is a specification.

This invention relates to vehicle brakes, more particularly to that class of brakes wherein the momentum of the vehicle, especially of a loaded vehicle when running down a grade, automatically applies a brake, and with means provided for manually applying the brake independently of the load operative means.

With these and other objects in view, the invention consists in certain novel features of construction as hereinafter shown and described and then specifically pointed out in the claim, and in the drawings illustrative of the preferred embodiment of the invention—

Figure 1 is a plan view of the conventional running gear of a wagon with the improved brake apparatus applied.

Fig. 2 is a side elevation partly in section of the parts shown in Fig. 1.

Fig. 3 is a transverse section on the line 3—3 of Fig. 2.

The improved apparatus may be adapted without material structural change to the running gear of wagons of various forms, but for the purpose of illustration is shown applied to a conventional running gear in which 10 represents the forward axle, 11 the forward bearing wheels, 12 the forward stationary bolster, 13 the forward swinging bolster, 14 the forward hounds, 15 the rear portion of the draft tongue, 16 the rear axle with the rear carrying wheels 17, the rear stationary bolster 18, the rear hounds 19, and the reach 20, the forward ends of the rear hounds being connected by plates 19' above and below the reach with a guide pin 19² extending through the plates and the reach.

Attached to the under face of the reach at its forward portion is a plate 21 extending at its forward end in advance of the reach and perforated to receive the king pin 22, the latter extending through the movable bolster 13, the stationary bolster 12 and the forward axle 10, as shown.

The reach 20 is slidable at its rear end between the rear axle 16 and the rear stationary bolster 18 in the ordinary manner.

Bearing over the rear hounds 19 and bolted or otherwise secured thereto is a brake beam support 23, and swingingly suspended as by links 24 from the support is a brake beam 25 carrying brake shoes 26 adapted to engage the rear wheels 17.

The draft tongue 15 is longitudinally slotted where it passes between the forward portion of the forward hounds 14, as shown at 27, to receive a pin or bolt 28 passing through the two parts of the hounds.

Plates 29 and 30 are attached to the upper and lower faces of the forward hounds and extend transversely of the tongue and cooperate with the forward hounds to hold the tongue from vertical displacement while leaving it free to move longitudinally within the range of the slot 27.

Slidable upon the upper face of the reach 20 and beneath the upper connecting plate 19' is an operating member in the form of a flat plate 31 having a longitudinal slot 32 through which the king pin 22 extends and with a segmental forward terminal 33, and terminating just in advance of the rear axle 16. The member 31 is slotted as shown at 31' where it passes beneath the upper plate 19' to receive the pin 19², as shown in Fig. 2. By this means the member 20 is guided and prevented from lateral displacement.

Attached to the rear end of the tongue 15 is an upwardly and downwardly directed stop plate 34 in position to be engaged by the segmental member 33, when the motive power, for instance the draft animals coupled to the tongue, is backed, or the rear portion of the vehicle moves forwardly, as hereafter explained.

Supported beneath the rear hounds and transversely thereof are two rock shafts 35 and 36, and attached to the rock shaft 35 and extending upwardly at each side of the reach 20 and the operating member 31, are arms 37, and extending through the arms above the member 31 is a coupling pin 38, the latter coupled at 39 to the member 31.

Rods 40 are connected at their ends respectively to the brake beam 25 and to the arms 37, so that the oscillation of the shaft 35 will apply the brake shoes to the rear wheels.

By this arrangement so long as the draft power is moving forwardly and strain thereby applied to the draft tongue, the latter will be in the position shown in Figures 1 and 2 with the brake beam and shoes in inoperative position, then if the vehicle starts down a grade, or is backed, the draft tongue will be moved rearwardly and cause the plate 34 to engage the segmental portion 33 of the operating member 31 and move the arms 37 rearwardly and cause the rods 30 to draw the brake beam and its shoes rearwardly and apply the brake to the rear wheels, and thus check the forward motion of the vehicle.

When the vehicle reaches level ground, the forward movement of the motive power draws the tongue forwardly and relieves the rearward strain from the member 31 and thus correspondingly releases the brake.

Attached to the rock shaft 35 is a cam arm 41, and attached to the rock shaft 36 is another cam arm 42 and extending from the rock shaft 36 is a pull lever 43 to which a pull rod 44 is attached, the latter adapted to lead to a point convenient to the driver on the seat of the vehicle, not shown.

By this arrangement the rock shaft 35 may be manually oscillated to apply the brake independently of the automatically operated mechanism before described.

The improved device is simple in construction, can be applied without material structural change to wagons of various forms and sizes.

The preferred embodiment of the invention is disclosed in the drawings and set forth in the specification, but it will be understood that modifications within the scope of the claims may be made in the construction without departing from the principle of the invention or sacrificing any of its advantages.

Having thus described the invention what is claimed as new is:

The combination with a vehicle running gear including the forward and rear axles, the carrier wheels, and a reach member, of an operating member movable longitudinally of the reach, forward and rearward rock shafts in spaced relation and mounted for oscillation on the running gear, arms carried by one of the rock shafts and coupled to the operating member, a brake beam carrying brake shoes, coupling means between said arms and brake beams, cooperating cam arms carried respectively by said rock shafts, means under the control of the driver of the vehicle for operating said forward rock shaft, and a draft tongue slidably coupled to the running gear and engaging the operating member by the rearward movement of the draft tongue or the forward movement of the rear axle.

In testimony whereof, I affix my signature hereto.

WILLIAM X Z. WILLIS.
his mark

Witness:
O. O'HERN.